May 18, 1948.  H. A. ROHDIN  2,441,940

METHOD AND APPARATUS FOR HEAT SEALING SHRINKABLE FILMS

Filed April 20, 1944  2 Sheets-Sheet 1

Inventor
Howard A. Rohdin,
By Ross C. Hurry
Attorney

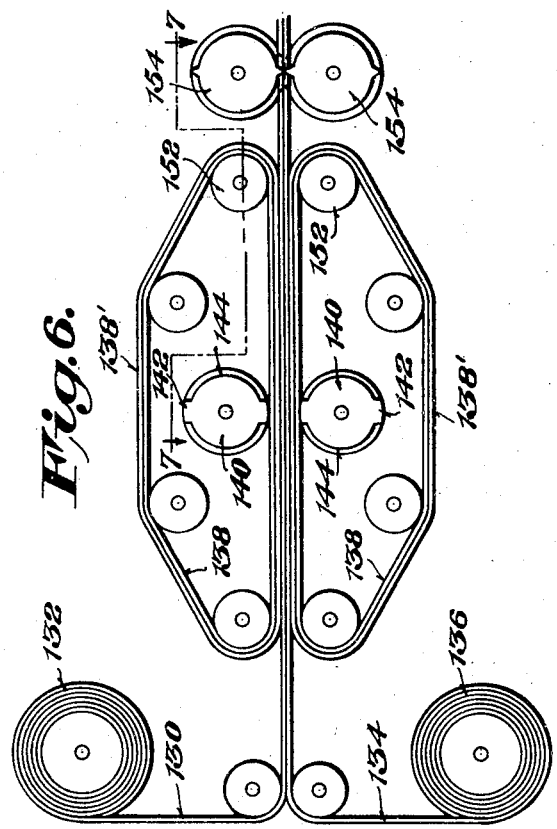
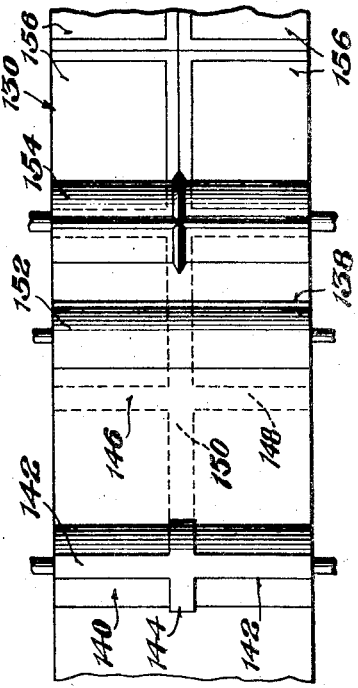
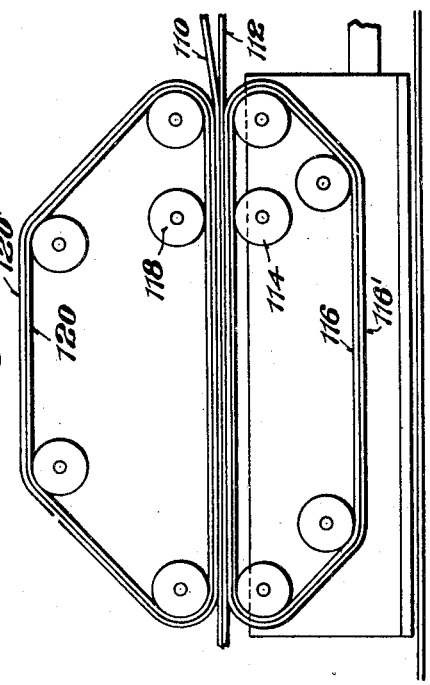
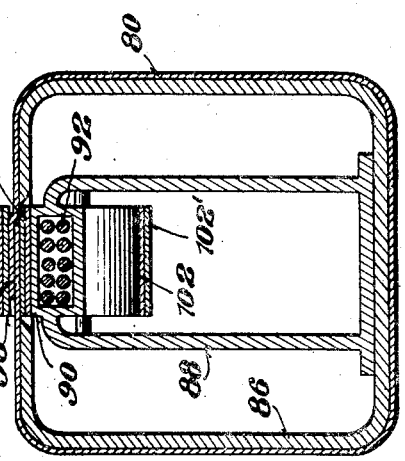

Patented May 18, 1948

2,441,940

UNITED STATES PATENT OFFICE 2,441,940

METHOD AND APPARATUS FOR HEAT SEALING SHRINKABLE FILMS

Howard A. Rohdin, Glen Ridge, N. J., assignor to Packaging Industries, Inc., Montclair, N. J., a corporation of New Jersey Application April 20, 1944, Serial No. 531,940

4 Claims. (Cl. 154—42)

This is an improvement upon the invention disclosed in my Patent No. 2,392,695, issued January 8, 1946.

The primary object of my invention is to provide an improved method of heat sealing, together with basic apparatus for carrying out the method, both method and apparatus being basically applicable to the manufacture of any type bar or container or to the closing of any type bag or container after the same is filled.

A further object of my invention is to provide an improved method and apparatus for heat sealing, particularly applicable to the sealing of such homogeneous films as saran.

These and other objects of my invention will be made clear from the following detailed description taken in connection with the annexed drawings in which:

Fig. 4a illustrates a modification of the apparatus shown in Fig. 4, this being adapted to continuous operation;

Fig. 5 is a section on the line 5—5 of Fig. 4;

Fig. 6 is a specialized form of apparatus applying my method to the production of bags sealed on three sides; and Fig. 7 is a partial plan view of the portions of Fig. 6 lying between the lines 7—7.

Figure 1:
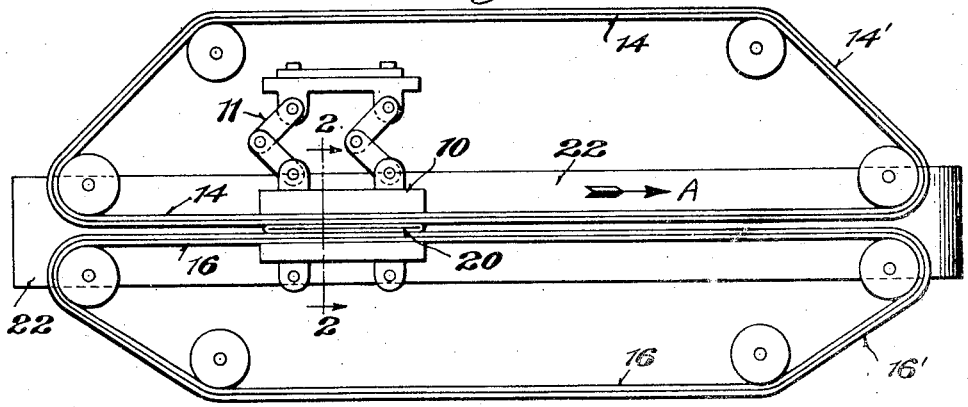
Figure 1 is a schematic illustration of one form of apparatus for carrying out my process in connection with step by step feeding.

Heat sealing is usually accomplished by subjecting the sheets to be sealed to the simultaneous action of heat and pressure, that is, by pressing the sheets to be sealed between heated members. In such operations the pressure not only contributes to the sealing effect but also accelerates the transmission of heat from the heated pressure members to the sealable material. Heat sealing considered without regard to the perfection of the seal has a considerable utility in that there is no necessity for waiting after the sealing step for the solvent of a wet adhesive to dry and take a permanent set. However, the materials involved in most heat sealing packages are usually so expensive that in practice heat sealing is resorted to only where an extreme perfection of seal is essential, as in vacuum packaging or in the packaging of greasy solids or liquids.

In recent years there has been an increasing use of synthetic homogeneous films in packaging operations. One of the most important of these is vinylidene chloride, either polymerized by itself or copolymerized with vinyl chloride or vinyl acetate. Such polymers or copolymers are known in the trade by the generic name "Saran" which includes such polymers or copolymers together with any of the usual plasticizers and/or stabilizers.

Polymerized vinylidene chloride has in itself an unusual tendency toward crystallinity and an extreme tendency to become embrittled at low temperatures. When, however, vinylidene chloride is polymerized together with vinyl chloride or vinyl acetate, the tendency toward brittleness is greatly reduced. Polymers or co-polymers containing vinylidene chloride are extremely susceptible to orientation. By cold working, extruded fibers can be drawn to several times their original length with tremendous increase in tensile strength. This characteristic is taken advantage of in the formation of films by extruding relatively thick-walled tubes and expanding these transversely of the axis, until the desired caliper of film is attained. For some reason, this orientation greatly increases the resistance of the resultant film to moisture vapor penetration, bringing the moisture vapor penetration index for saran down below .1, which compares with the Government requirement for packaging material of .25.

The tendency of saran toward crystallization is accelerated at higher temperatures, which is probably a contributing factor in the effect which this invention is intended to overcome. When containers made of oriented saran film are heat-sealed, shrinkage takes place during the cooling of the film from the sealing temperature (in the neighborhood of 300° F.) back to room temperature. This shrinkage is so marked as to ruin the appearance of the package. In many cases, with the shrinkage taking place actively at or near the softening point, the hermetic character of the seal is destroyed. Hermetic sealing of saran packages, therefore, involves a problem of providing mechanical resistance against shrinkage during the cooling of the seal. I have found that, if the belts hereinafter described are coated on their work-engaging surfaces with a suitable substance such, for example, as the glue ordinarily applied to gummed tape (hereinafter referred to as "gum"), these belts, when subjected to heat and pressure, will firmly adhere to the saran of the bag and, being maintained at constant length, under tension, will inhibit shrinking during the traveling of the belts away from the sealing point until the cooling has been fully accomplished. Once the saran is cooled, adhesion between the gummed belt surfaces and the saran ceases and the package may be removed from between the belts.

In order to apply heat and pressure, heated surfaces must approach each other sufficiently to exert a substantial pressure upon sealable material placed therebetween and inevitably such surfaces must thereafter recede from each other to release the sealable material. This is true whether the heated surfaces be reciprocating members, such as sealing jaws, or cylindrical members, such as heated pressure rolls or the intermediate structure comprising opposed tractor type treads. Since the pressure members are heated, their separation must inevitably take place while the sealable material is at the maximum temperature attained in the particular sealing step. Under such conditions most homogeneous films will have a tacky or sticky quality with respect to the heated surfaces and the separation of these surfaces tends to separate the opposed films which are intended to be sealed. Sometimes this tendency toward separation is not sufficiently pronounced to produce an imperfect seal, but very frequently imperfect seals are thus produced and in the manufacture or closing of hundreds of millions of packages this is a very substantial element of waste, particularly when the high cost of the material involved is taken into account.

I have found that by interposing, between the heated surfaces and the sheets to be sealed, sheets or strips of material which under no circumstances will cling to the heated pressure surfaces, I am able to avoid entirely the above described effect.

Figure 2:
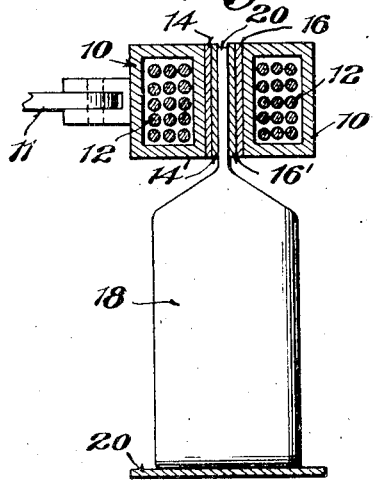
Fig. 2 is a section on the line 2—2 of Fig. 1.

Referring now to Figs. 1 and 2, I show a pair of heated pressure jaws 10. The heating may be accomplished by means of electric coils 12 or by any other suitable means. The jaws 10 are moved toward and from each other by a toggle mechanism 11, although any other mechanism for producing the same or an equivalent motion will be equally satisfactory. Between the jaws 10 run belts 14 and 16. These belts may be formed of any material suitable relative to the particular sheets to be sealed; that is, the belts may be formed of cloth, felt, leather, paper, woven wire, or even certain synthetic materials. The work-engaging surface of the belt 14 is surfaced at 14' with gum as is the work-engaging surface 16' of the belt 16. The belts travel in the direction of the arrow A in a step by step movement synchronized with the movement of the jaws 10 by any conventional means; that is, the belts 14 and 16 advance in the direction of the arrow A, while the jaws 10 are separated and the jaws 10 come together to exert pressure during a dwell or pause in the movement of the belts 14 and 16. Bags 18 have their walls 20 at their open mouths collapsed into a single plane and the collapsed walls 20 are fed between belts 14 and 16. In handling filled packages it will usually be convenient to have the bags travel in a vertical position, in which case the weight of the contents may be supported by a belt 22. If the bags are empty and it is merely desired to form a side or bottom seam, the bags may travel in the horizontal plane, in which case conveyor belt 22 may be eliminated.

The belts 14 and 16 carry the bags 18 to bring the mouths 20 thereof between the jaws 10. During a pause in the advance of the belts the jaws 10, actuated by the toggle or other suitable means 11, come together with substantial pressure. The heat of the jaws 10 is transmitted through the belts 14 and 16 to raise the temperature of the walls 20 of the bags 18 and when a sufficient temperature is attained the walls 20 coalesce to form a perfect seal. With any belts other than flat metallic ribbons, that is, belts formed of cloth, leather, felt or woven wire, etc., there is sufficient pliability in the cross section of the belts themselves to eliminate any localization of pressure due to ordinary differences of caliper in the walls 20, and this is an important factor in decreasing the opportunities for the formation of imperfect seals.

Because the material of the walls 20, under the effect of heat and pressure, adheres firmly to the surfaces 14' and 16' of the belts or members 14 and 16, the path of the belts 14 and 16 is maintained in a straight line beyond the jaws 10 for a sufficient distance to permit the walls 20 to cool below the temperature of plasticity. By the term "temperature of plasticity" I mean to include any temperature at which the material to be sealed is sufficiently plastic, tacky or adherent to form any appreciable bond between the material to be sealed and the material of the belts or members 14 and 16. After the walls 20 have cooled below the temperature of plasticity, the bags 18 may readily be removed from the belts 14 and 16, either by separation of the belts permitting the bags 18 to drop or by the use of pickers or strippers, should there be sufficient residual adhesion of the walls 20 to the belts 14 and 16 to warrant the use of such means. A slight strain at such a temperature has no effect upon the perfection of the seal which is designed and dimensioned to withstand, when cool, a far greater strain than is occasioned by detachment from the belts 14 and 16. The coalescence of the meeting faces of the walls 20 will be complete because of the cooling action.

Figure 3:
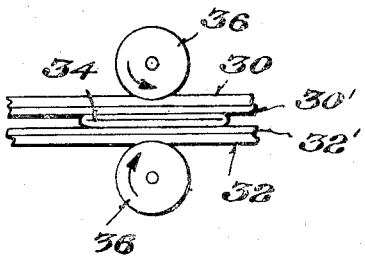
Fig. 3 is a partial schematic view illustrating the adaptation of the method performed by the apparatus of Figs. 1 and 2 to a continuous instead of a step by step feed.

In Fig. 3, I show belts 30 and 32 and a collapsed bag mouth 34 between the belts, all passing between heated pressure rollers 36. The surfaces of the rollers 36 separate immediately following the application of pressure at the nip of the rollers 36. The belts 30 and 32 continue in a straight line, after passing through the nip of rollers 36, for a sufficient distance to permit cooling the bag mouth 34 below the temperature of plasticity. If any substantial speed is attained it is obvious that there will be very little time in which the rollers 36 may act to raise the temperature of the bag mouth 34. This, however, may be compensated for by using several sets of rollers 36 or by preheating the bag mouth 34 before it reaches the nip of rollers 36. The belts 30 and 32 have, respectively, gummed surfaces 30' and 32' to coact with saran as above described.

Figure 4:
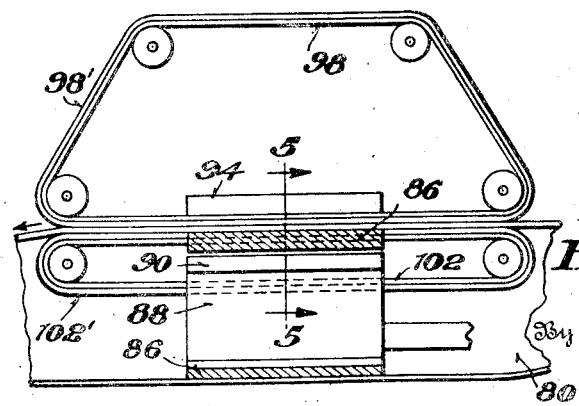
Fig. 4 is a schematic illustration of the application of my process to the step by step formation of tubes on a modification of the conventional tuber.

In Figs. 4 and 5, I illustrate the application of my process to the formation of side or center seams on a conventional tuber. A web of thermoplastic material 80 is drawn from a reel and passed over a tuber 86, where its margins are brought into overlapping relationship to form a tube. Ordinarily in the formation of such a tube it is brought into flattened condition as rapidly as possible. In the application of my process, however, I form the tuber 86 in such manner as to maintain, for an appreciable distance, the maximum cross sectional area of the tube. Within the tuber 86 I place a standard 88 which supports a pressure member 90 heated by coils 92. Above the tuber 86 I provide a reciprocating pressure member 94 heated by coils 96. A belt 98 passes under the pressure member 94 between it and the overlapped margins 100 of the web 80, while a belt 102 passes above the pressure member 90 and below the overlapped margins 100. The web 80 in this form advances step by step and during each pause in the forward movement the upper pressure member 94 is brought down to compress and heat the margins 100 of the web 80 between the belts 98 and 102. As mentioned before, there must be a sufficient undisturbed travel of the belts 98 and 102 following the action of the pressure members 90 and 94 to permit the requisite cooling to take place, and the forward steps of the web 80 will usually be calculated with reference to the length of the pressure members 90 and 94 to assure the formation of a continuous seam. Following the formation of the seam and its discharge from the belts 98 and 102, the tube is brought into conventional flattened condition, at which time consecutive bag lengths are severed therefrom and one end of each length may be closed by any of the methods heretofore discussed. The belts 98 and 102 have, respectively, gummed surfaces 98' and 102' for coaction with saran as above described.

In Fig. 4a, I illustrate a modification of Fig. 4 in which a web 110 passes over a tuber 112 in which is arranged a heated pressure roller 114 and its associated belt 116, while above the tuber is a heated pressure roller 118 and a belt 120. Such an arrangement offers the opportunity for continuous travel of the web 110 as distinct from the step by step movement of the web 80 of Fig. 4. Here belt 116 has gummed surface 116' and belt 120 has gummed surface 120'.

In Figs. 6 and 7, I illustrate a further application of my invention to the manufacture of flat bags of the type which are produced by forming seams along three consecutive edges. In this application a web of thermoplastic material 130 is drawn from a reel 132 and superimposed upon a web 134 of similar material drawn from a reel 136. The superimposed webs 130 and 134 then pass between a pair of belts 138 which completely overlie the superimposed webs. The belts 138 and the webs 130 and 134 then pass between heated pressure rollers 140. These rollers have longitudinal raised portions 142 and a central circumferential raised portion 144 and their effect is to form, in the superimposed webs, lines of sealing 146, 148 and 150. Rollers 152 act as guides for the belts 138 and also as draw rollers for the webs 130 and 134. As the webs 130 and 134 emerge from the nip of the rollers 152 they pass between rotary cutters 154 which sever the webs 130 and 134 midway of the sealed areas 146, 148 and 150 to form individual bags 156. The travel between heated pressure rollers 140 and draw rollers 152 must be sufficient to permit the requisite cooling. Obviously, this particular method is adaptable to step by step travel of the webs 130 and 134, in which case flat bed pressure members would be utilized instead of rollers 140. In any case, for coaction with saran belts 138 have gummed surfaces 138'.

Throughout this specification I have described pairs of pressure members in which both members are heated. I do not, however, intend to be limited to such an arrangement, since for many purposes only one of the pressure members need be heated, and where one member is hot and the other at room temperature it may sometimes be possible to dispense with one of the protective belts or members.

This invention represents first the discovery of a physical phenomenon, namely, the tendency of a particular type of film, once it is heated to or approximately to its temperature of plasticity, to shrink upon cooling below such temperature and, second, a method of overcoming this phenomenon in the practical use of a film having that characteristic. So far as is known at present, saran films are the only films available having the above described characteristic and, so far as is now known, only glue of the type at present used in ordinary gummed tape, that is, which is softened by the application of moisture and adheres to adjacent surfaces on drying, will satisfactorily perform the process herein disclosed when used completely dry.

What I claim is:

1. A method of heat sealing comprising: superimposing in a plane a plurality of plies of oriented saran film; placing a shielding member on each exposed surface of said plies, said shielding members being substantially rigid in the plane of the plies; subjecting said shielding members to heat and pressure to seal the plies and to cause them to adhere to said members; removing the heat and pressure when the plies are sealed, and cooling the plies below the temperature of adhesion to said members while maintaining said plies and members in undisturbed contact during such cooling; said adhesion between said plies and said members being obtained by coating the ply contacting surface of said members with a dry film of material capable of adhering to said plies when the same are heated and of not adhering to said plies when the same are cooled.

2. The method of claim 1 in which the coating of the members is glue.

3. Apparatus for heat sealing superimposed plies of heat sealable material, having the property of shrinking materially during cooling from sealing temperature to room temperature, said apparatus comprising a pair of opposed members adapted to receive between them the plies to be sealed, said members being substantially rigid in the plane of the plies; means to apply heat and pressure to said members to seal said plies; means to separate said members from said heat and pressure applying means, whereby to permit cooling of the plies and members with said plies and members in undisturbed contact during such cooling the members having their ply contacting surfaces coated with a dry film of material which adheres to said plies at sealing temperature but not at room temperature.

4. Apparatus as set forth in claim 3 in which the members are coated with glue.

HOWARD A. ROHDIN.

REFERENCES CITED

The following references are of record in the file of this patent:

UNITED STATES PATENTS

| Number | Name | Date |
|---|---|---|
| 2,238,342 | Riehl | Apr. 15, 1941 |
| 2,329,867 | Whitehead | Sept. 21, 1943 |
| 2,343,117 | Vincent | Feb. 29, 1944 |
| 2,392,695 | Rohdin | Jan. 8, 1946 |